(12) United States Patent
Kurtz et al.

(10) Patent No.: US 7,584,665 B2
(45) Date of Patent: Sep. 8, 2009

(54) COMBUSTION TRANSDUCER APPARATUS EMPLOYING PRESSURE RESTRICTION MEANS

(75) Inventors: Anthony D. Kurtz, Ridgewood, NJ (US); Elias Geras, Pearl River, NY (US)

(73) Assignee: Kulite Semiconductor Products, Inc., Leonia, NJ (US)

( * ) Notice: Subject to any disclaimer, the term of this patent is extended or adjusted under 35 U.S.C. 154(b) by 349 days.

(21) Appl. No.: 11/036,884

(22) Filed: Jan. 14, 2005

(65) Prior Publication Data

US 2006/0157133 A1  Jul. 20, 2006

(51) Int. Cl.
*G01L 9/06* (2006.01)
(52) U.S. Cl. .............................. 73/721; 73/715; 338/42; 138/41; 138/42
(58) Field of Classification Search .................... 138/44, 138/42, 41; 73/715, 721; 338/42, 36
See application file for complete search history.

(56) References Cited

U.S. PATENT DOCUMENTS

| | | | | |
|---|---|---|---|---|
| 3,851,526 A | * | 12/1974 | Drexel | 73/202 |
| 3,930,823 A | | 1/1976 | Kurtz et al. | |
| 4,222,277 A | * | 9/1980 | Kurtz et al. | 73/721 |
| 4,484,472 A | * | 11/1984 | Licinit et al. | 73/204.11 |
| 4,522,072 A | * | 6/1985 | Sulouff et al. | 73/765 |
| 4,926,155 A | * | 5/1990 | Colla et al. | 338/36 |
| 4,994,781 A | * | 2/1991 | Sahagen | 338/47 |
| 5,080,131 A | * | 1/1992 | Ono et al. | 137/599.11 |
| 5,445,035 A | * | 8/1995 | Delajoud | 73/861.52 |
| 5,495,872 A | * | 3/1996 | Gallagher et al. | 138/44 |
| 5,955,771 A | | 9/1999 | Kurtz et al. | |
| 6,186,179 B1 | * | 2/2001 | Hill | 138/39 |
| 6,272,928 B1 | * | 8/2001 | Kurtz | 73/721 |
| 6,293,154 B1 | | 9/2001 | Kurtz | |
| 6,539,968 B1 | * | 4/2003 | White et al. | 137/10 |
| 6,870,236 B2 | * | 3/2005 | Johnson | 257/414 |
| 7,013,735 B2 | * | 3/2006 | Miyazawa | 73/717 |
| 2001/0030596 A1 | * | 10/2001 | Barbier | 338/42 |
| 2004/0187588 A1 | * | 9/2004 | Miyazawa | 73/716 |

* cited by examiner

*Primary Examiner*—James F Hook
(74) *Attorney, Agent, or Firm*—The Plevy Law Firm

(57) ABSTRACT

A pressure restrictor for use with a pressure sensing element comprising a cylindrical member of a given diameter and length having a plurality of apertures directed from a first end to a second end is disclosed. A pressure restrictor housing holds and positions the cylindrical member in close proximity to the pressure sensing element at the second end by clamping the pressure restrictor between the housing and element. The apertures provided in the pressure restrictor are the sole path for application of pressure to the sensing element. The sensing element is a double diaphragm silicon sensor where one diaphragm is exposed to pressure and the other diaphragm is not exposed to pressure. Each diaphragm has located thereon a half-bridge wherein both half bridges are connected to provide a full bridge. The full bridge provides an output strictly proportional to pressure.

9 Claims, 3 Drawing Sheets

COMBUSTION TRANSDUCER APPARATUS EMPLOYING PRESSURE RESTRICTION MEANS

FIELD OF THE INVENTION

This invention relates to pressure transducers and more particularly to a pressure transducer for combustion measurements employing a pressure restrictor.

BACKGROUND OF THE INVENTION

Pressure transducers are employed for measuring the combustion dynamics in an internal combustion engine. Such transducers are referred to as combustion transducers. The transducer desirably should be of a small size and have the capability of performing static and dynamic measurements. The transducer should have a high natural frequency for fast data rates and be extremely durable for the typical combustion engine environment.

As one can ascertain, a combustion engine is an extremely reliable device which can operate under relatively high temperatures in very different environments. The Assignee herein, namely, Kulite Semiconductor Products, Inc. has a number of patents which involve a technology referred to as silicon on insulator (SOI) leadless technology. These sensors are capable of withstanding harsh environments, extreme operating temperatures in excess, for example of 600° C. and high vibrations.

As will be described the device employed herein utilizes an innovative transducer design employing a vibration insensitive sensing element. This transducer employs two diaphragms with one exposed to pressure and inertial forces and the other exposed only to inertial forces. Each diaphragm is associated with a half bridge which half bridges are wired into a full bridge employing differential action where inertial forces are cancelled.

The Assignee, namely, Kulite Semiconductor Products has various patents as well as pending applications which show transducer arrangements.

It is understood that a major aspect of the present invention is the use of a pressure restrictor which can be changed according to environment and which is simple to fabricate and operates with great efficiency.

SUMMARY OF THE INVENTION

The present invention relates to a pressure restrictor for use with a pressure sensing element. This pressure sensing element is fabricated from silicon and includes two diaphragm. Each diaphragm includes a half bridge. One diaphragm is associated with a pressure input while the other diaphragm is isolated from the pressure input. In this manner the two half bridges are wired to form a full Wheatstone bridge which full bridge will provide an output completely proportional to pressure while other effects such as inertial effects as acceleration and so on are cancelled. In order to utilize the pressure sensing element in a harsh environment such as that provided by a combustion engine, the sensing element is associated with a pressure restrictor. The restrictor consists of a cylindrical member of a given diameter and length. The member having a plurality of apertures directed from the first end to a second end. The apertures restrict the frequencies which can be applied to the pressure sensing element.

A pressure restrictor housing is provided for holding and positioning the cylindrical restrictor member in close proximity to said pressure sensing element at said second end, with said apertures providing the sole path for application of pressure to said sensing element. The pressure restrictor is located in an aperture of said housing for enabling said first end to receive an applied pressure at a given frequency, which applied pressure is received by only one of said diaphragms.

DETAILED DESCRIPTION OF THE INVENTION

Figure 1:
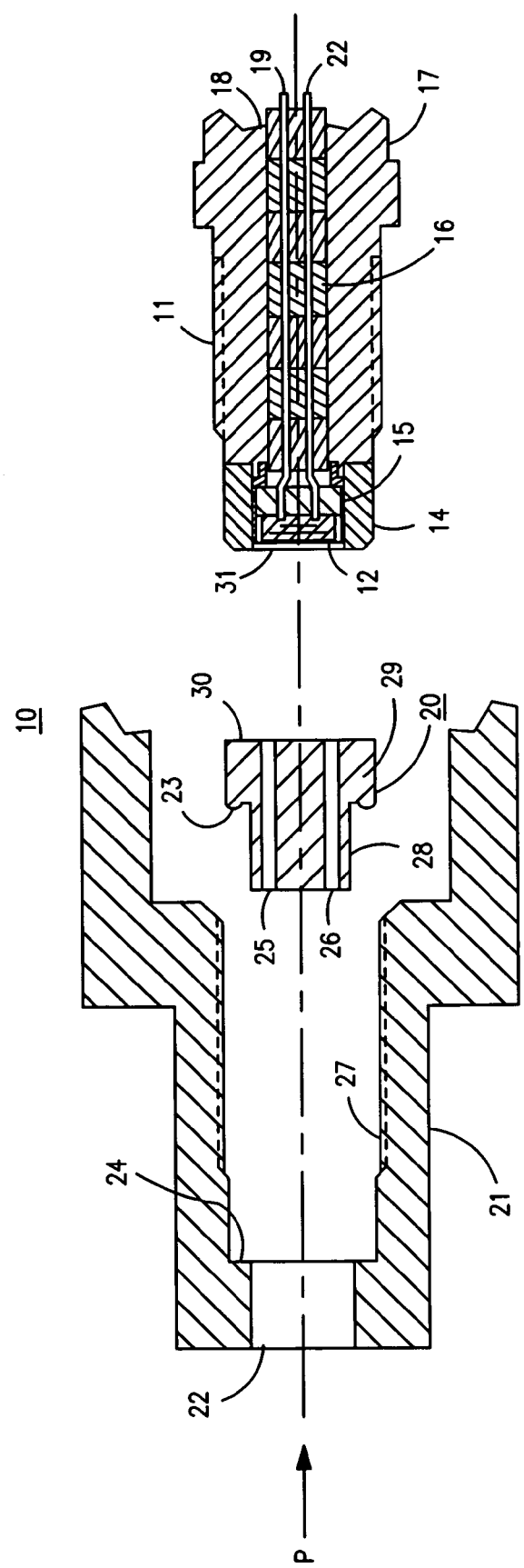
FIG. 1 is a cross sectional view of a combustion transducer employing a pressure restrictor device according to this invention.

Referring to FIG. 1, there is shown a cross sectional view of a combustion transducer according to this invention. Essentially as one can see from FIG. 1, there is a pressure sensing element 12 which is a silicon sensing element which operates to sense applied pressure. In any event, the pressure sensing element 12 is arranged in a front section or front adaptor section of a screw housing 17. The housing 17 is a metallic structure and has a central aperture 18 which aperture allows leads such as 19 and 22 to extend from the pressure sensing element 12 through the screw housing 17. The housing 17 is of a conventional design.

As can be seen, the leads 19 and 22 are surrounded by ceramic insulators 16. These ceramic insulators serve to position the leads firmly within the housing and to further insulate the leads. This enables the transducers to operate at high temperatures. The ceramic insulation are stacked one against the other as seen to fully cover the leads.

The pressure sensing element 12 is incorporated within a header 15 through which header the leads as 19 and 22 extend. The header 15 may be fabricated from a high temperature glass.

As seen in FIG. 1, there is a mechanical pressure restrictor housing 21 which essentially has a front aperture 22. The front aperture 22 enables one to position the pressure restrictor 20 into the front aperture with the flange 23 of the restrictor abutting against the peripheral wall of the mechanical pressure restrictor housing 21. The pressure restrictor 20 as seen has a plurality of apertures such as 25 and 26.

In any event, the novel construction of the internal combustion transducer 10 incorporates the interchangeable pressure restrictor 20. The pressure restrictor 20 essentially is a filter and is positioned between the sensing element 12 and the pressure source P. The mechanical pressure restrictor housing 21 receives the front portion 28 of the cylindrical pressure restrictor 20. The front portion 28 is inserted into aperture 22 of the housing 21. The flange 23 associated with the larger diameter back portion 29 of the restrictor 20 abuts against the inner housing wall 24 and is held in place when the screw housing 17 is screwed into the mechanical restrictor housing 21 by means of screw threads 11 of housing 17 and threads 27 of housing 21. The restrictor 20 is located as close to the sensing element as possible. This enables one to reduce the depth of the cavity. The restrictor 20 is mechanically clamped between the sensor 12 and the mounting housing 21. This construction enables one to interchange the restrictors 20 with ease and to select the restrictor frequencies based on different restrictors to customize the frequency response of the transducer for the particular measuring application.

The filter or restrictor 20 design can be varied to have different size holes as 25 and 26 as well as other varying dimensions. As one can ascertain the filter can be made longer or shorter. The back end 30 of the restrictor 20 abuts almost directly at the front of the housing 31 so that it is close contact with the pressure sensing element 12. In this manner lower frequency filters or restrictors 20 can be used for evaluation purposes. The restrictor is clamped in place by the housing 17 and the housing 21.

The size and the number of apertures as 25 and 26 can be changed. Higher frequency filters can be implemented for evaluation of knocking and other phenomena associated with internal combustion engines. These phenomena are accompanied with higher frequency operation. Overall, the frequency of the transducer 10 can be adjusted from 15 KHz up to 150 kHz via the filter restrictor selection process. The filter 20 or restrictor as seen is basically cylindrical with the back flange 23 enabling it to abut against the aperture.

Figure 2:
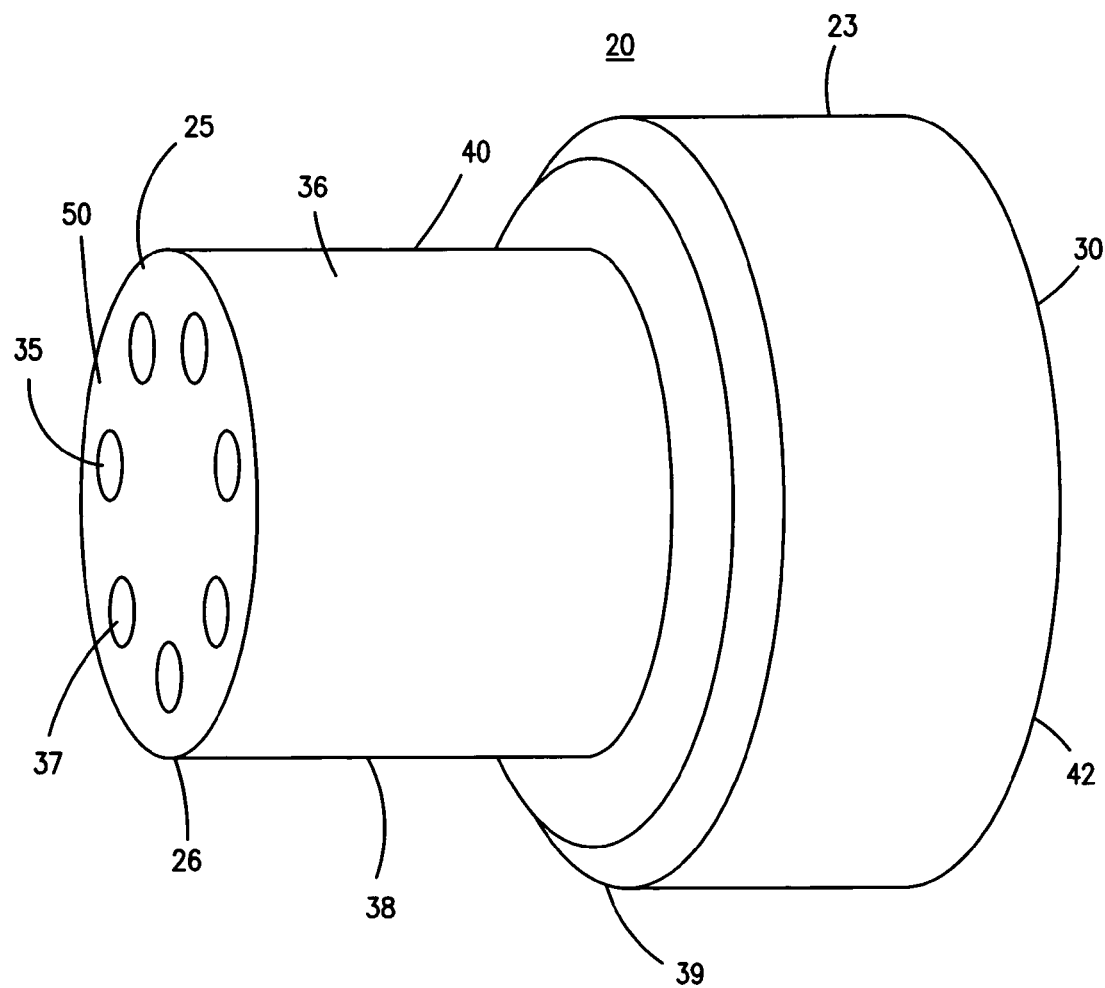
FIG. 2 is a perspective view of a pressure restrictor according to this invention.

Referring to FIG. 2, there is shown a perspective view of a restrictor 20 or filter as depicted in cross sectional view in FIG. 1.

As seen the restrictor consists of a cylindrical front portion 40 which is contiguous with a larger back cylindrical portion 42. There is an indented flange 23 between the cylindrical portions 40 and 41.

As seen there are a number of apertures such as 25, 26 as depicted in FIG. 1 and apertures 36, 35, 37 and 38. As one can ascertain, the apertures depicted in FIG. 2 are 6 in number. It is also understood that there can be more or less apertures depending upon the frequency response required. The diameter of the apertures as well as the configuration can be varied.

In any event, the apertures or filter holes as 25, 37 and so on extend through the restrictor 20 from the front surface 50 to the back surface 30. This is of course clearly shown in FIG. 1 for apertures 25 and 26. The diameter of the apertures can be varied as well as the number and arrangement according to the designed frequency of operation.

Furthermore, the peripheral flange separating the front portion 40 from the back cylindrical portion 42 can be of a different depth and enables the top portion of the flange to exhibit a close coupling to the back wall of the mechanical pressure restrictor 21 due strictly to the clamping action of housings 17 and 21.

The dimensions of the front portion 40 can be varied as the front section 40 can be made greater or smaller in length. The flange 23 height can be varied to enable different sized restrictors to be properly clamped. This is true of the back section 40 too as long as it is properly accommodated in the aperture 22 of the mechanical pressure restrictor 21.

As is clearly seen from FIG. 1, the peripheral flange 23 with the extended ends abuts against the back wall 24 of the mechanical pressure restrictor 21. The flange enables good coupling while preventing undue vibration of the restrictor element. Basically shown in FIG. 1 the mechanical pressure restrictor housing 21 which accommodates the pressure restrictor 20 and which accommodates the screw housing 17 is positioned at any desired location within the internal combustion engine and operates to hold the pressure sensing element 12 in close contact with the restrictor 20 which as indicted is clamped in position between housing 17 and housing 21.

Figure 3:
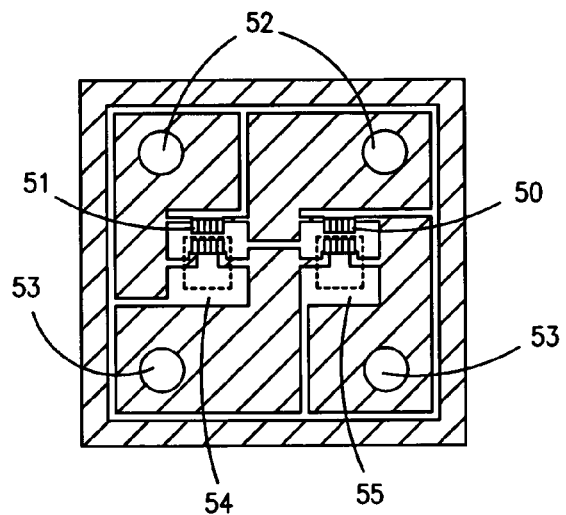
FIG. 3 is a top plan view of a pressure sensing element utilized in conjunction with this invention.

Referring to FIG. 3, there is shown a top plan view of a pressure sensing element or a pressure sensing combination which is utilized in this invention. The pressure sensor depicted in FIG. 3 is a Kulite innovation and essentially reference is made to a co pending application Kulite-103 entitled "Transducer Responsive To Pressure, Vibration/Acceleration and Temperatures and Methods of Fabricating The Same". This application, namely Kulite 103 was filed on Dec. 3, 2004 and depicts a pressure sensing element which is the element utilized in this particular invention.

In any event, by referring to FIG. 3, there is shown a top plan view of the typical pressure sensing element. The sensing element is based on a silicon on insulator (SOI) leadless technology. These sensors are capable of light temperature operation of 500° C. and higher and withstand high vibration. As shown in FIG. 3, the sensor employs two deflecting diaphragms depicted by reference numerals 54 and 55. Each diaphragm has piezoresistors located thereon and on each diaphragm one half of a Wheatstone bridge is formed utilizing two piezoresistors in series.

Typically, one piezoresistor of each pair increases in resistance with a positive normal stress applied to the plane of the associated diaphragm while the other decreases. One sensing diaphragm for example diaphragm 55 is exposed to the pressure media while the other diaphragm is isolated from the media. Due to the geometry of the sensing elements, both sensing diaphragms respond to shock or vibration, however only one sensing diaphragm will respond to the applied pressure signal.

The two half bridges from each diaphragm are electrically coupled to form a full bridge such that for a positive stress applied substantially normal to both diaphragms, the bridge output of one half bridge will subtract from the other. Thus, the signal output is responsive to the pressure applied to one diaphragm while the signal response to inertial stresses and indeed any other stress other than that due to pressure applied to both diaphragm is cancelled.

Thus, the sensor depicted in FIG. 3 provides an output that is proportional to pressure only. Complete cancellation is dependent on the two deflecting diaphragms having the same size thickness and matching piezoresistive characteristics. The sensors are typically used in 100 to 500 bar range. The piezoresistive sensors themselves have an internal frequency in these pressure ranges in excess of 1 Mz. However, in the construction of the transducer there exist a cavity in front of the diaphragm and depending on its depth it produces an organ type resonance that is at a significantly lower frequency.

Additionally, the transducers are generally installed by being threaded into an adaptor which is itself threaded into the internal combustion engine. This is shown in FIG. 1. Thus, in this structure the resulting internal frequencies are determined by the organ pipe effect induced by the fitting into which the transducer is installed. Such fitting being the one that is threaded into the engine. It is desired to use the restrictor 20 located in the proximity of the transducer to avoid particle contamination at a defined tuned frequency of the transducer mounting adaptor. Thus, the sensing arrangement shown in FIG. 3 is particularly suitable for use as a combustion transducer. This is due to pressure in which the restrictor 20 can be changed.

Figure 4:
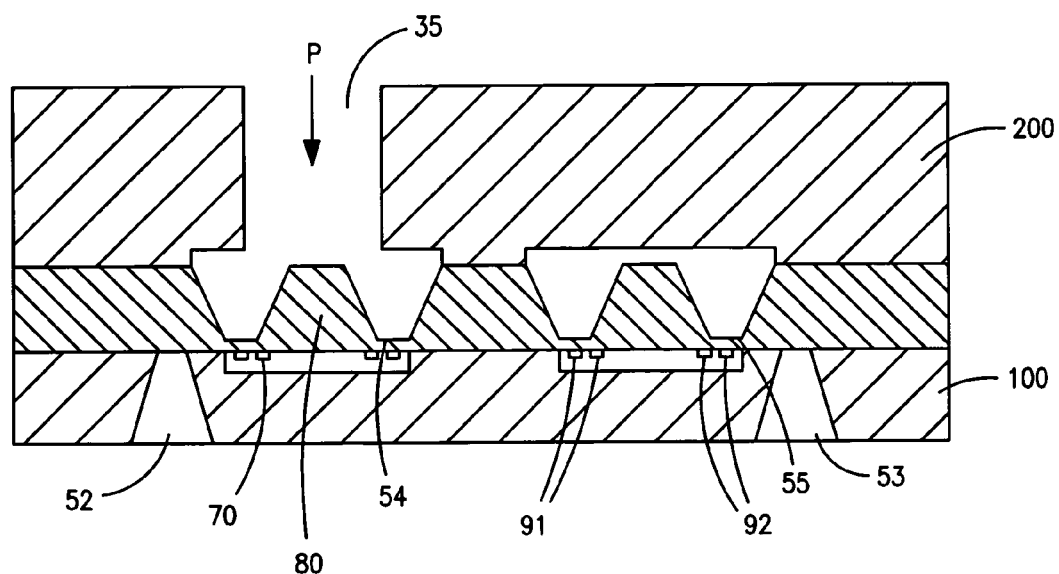
FIG. 4 is a cross sectional view of the pressure sensing element depicted in FIG. 3.

In FIG. 4, there is shown a cross sectional view of the sensing device depicted in FIG. 3.

As one can ascertain from FIG. 4, there is shown a top cover 200 which may be conventionally formed of glass or silicon as coupled to a silicon wafer 100 by means of a conventional seal. The silicon wafer 100 is treated by conventional photolithography techniques to produce a central boss area and a diaphragm section which is a thin section. The diaphragm section contains the sensing resistors such as 70, 80, 91, 92. Each of the diaphragms as 54 and 55 is associated with appropriate sensing resistors. There are apertures associated with each of the diaphragms which enable connection to metal contacts such as 52 and 53 depicted both in FIG. 3 and FIG. 4.

Reference is also made to U.S. Pat. No. 5,955,771 entitled "Sensor For Use In High Vibrational Applications And Method For Fabricating Same, issued Sep. 21, 1999 to A. D. Kurtz et al. The entire disclosure of that patent is incorporated herein by reference.

The patent teaches a hermetically sealed device which can be used with the present invention. It is understood that other structures can be used as well. The resulting structure is a sensor without external leads being suitable for high temperature mounting and referred to as leadless sensors.

In any event, as seen in FIG. 4, pressure is only applied to the diaphragm 54 while no pressure is applied to diaphragm 55. In this manner, diaphragm 54 produces an output indicative of pressure and external forces while diaphragm 55 produces an output indicative of only external forces. The external forces are inertial as vibration and acceleration. These other external forces are also applied to diaphragm 54.

Thus, as one can ascertain, diaphragm either 54 or 55 can measure pressure as having the aperture 85 associated therewith. The other diaphragm as either 54 and 55 has no aperture and is closed off by the glass cover plate and therefore is not responsive to pressure.

While it is understood that in FIG. 3, diaphragm 54 was the diaphragm having an active area not measuring pressure, it is also understood that the diaphragms could be reversed depending on which diaphragm is associated with the aperture 85. In any event in conjunction with the above-noted restrictor and the mechanical mounting for the restrictor one now has a transducer which is utilized in combustion applications requiring high pressures and high temperatures, with pressure frequency restrictor.

It should be apparent to those skilled in the art that various other alternate embodiments can be discerned and all are deemed to be encompass within the breadth and scope of the claim appended hereto.

What is claimed is:

1. A pressure restrictor for use with a piezoresistive pressure sensing element, said element capable of providing an output upon application of a pressure to said element, said pressure restrictor, comprising:

a restrictor member having a plurality of apertures symmetrically disposed about a central axis of said restrictor member directed from a first end to a second end;

a pressure restrictor housing for clamping said restrictor member to said pressure sensing element at said second end, and said first end of said restrictor located in said housing for enabling said first end to receive an applied pressure and to pass said applied pressure to said second end solely through said apertures, wherein said pressure sensing element comprising:

a first and a second deflecting diaphragms positioned on a common substrate, wherein the first diaphragm is positioned on said substrate to respond to an applied pressure transmitted from first end to said second end via at least one of said apertures and said second diaphragm is positioned in line with said central axis of said restrictor member and substantially isolated from said applied pressure, each diaphragm having located thereon piezoresistors arranged in a half bridge configuration, with each half bridge connected to form a full Wheatstone bridge to enable said pressure element to provide an output proportional to said applied pressure with all inertial stresses cancelled.

2. The pressure restrictor according to claim 1, wherein said restrictor member being a cylindrical member.

3. The pressure restrictor according to claim 2, wherein said cylindrical member has a front cylindrical portion of a given length and diameter with a back cylindrical portion contiguous with said front portion of a greater diameter and of a different length, with said front and back portions coaxially positioned to form a flange at the juncture between said portions, said apertures extending from said first end of said front portion to said second end of said rear portion.

4. The pressure restrictor according to claim 3, wherein said flange abuts against an inner wall of said pressure restrictor housing to enable said front portion of said restrictor to be positioned in an aperture of said housing to enable pressure to be applied and directed via said plurality of apertures.

5. The pressure restrictor according to claim 3, where said flange has a concave indentation about a top surface.

6. The pressure restrictor according to claim 1, wherein said pressure sensing element is fabricated from silicon.

7. The pressure restrictor according to claim 1, wherein said plurality of apertures are six in number.

8. The pressure restrictor according to claim 1, wherein a length of said restrictor is much greater than a length of said pressure sensing element.

9. The restrictor according to claim 1, wherein the frequency of operation of the pressure sensing element is adjustable from 15 KHz to 150 KHz.

* * * * *